July 18, 1933. G. W. PERKS 1,919,168
COMPOSITE FRICTION MATERIAL AND METHOD FOR MAKING THE SAME
Filed Feb. 24, 1932 2 Sheets-Sheet 1
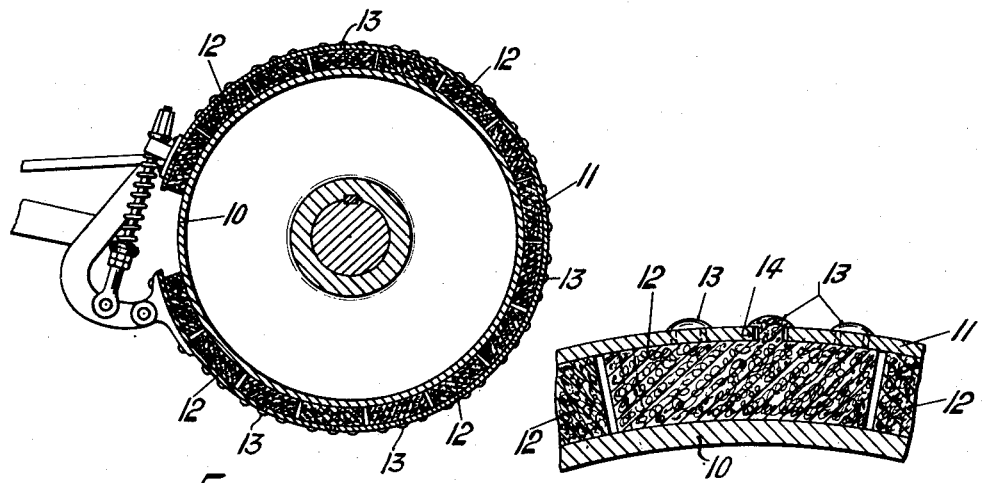
Fig.-1
Fig.-2
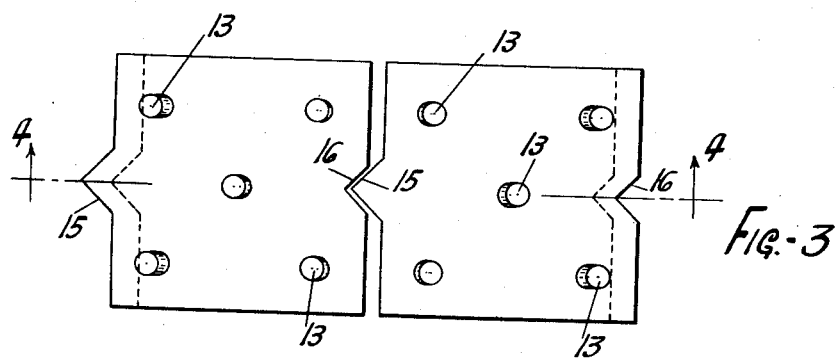
Fig.-3
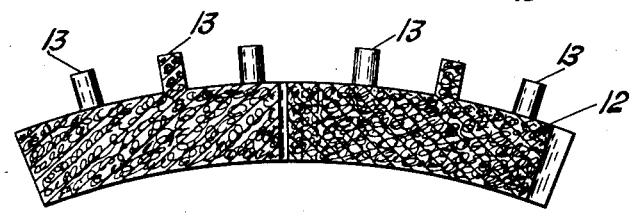
Fig.-4
INVENTOR
GEORGE W. PERKS
BY
ATTORNEYS July 18, 1933.  G. W. PERKS  1,919,168
COMPOSITE FRICTION MATERIAL AND METHOD FOR MAKING THE SAME
Filed Feb. 24, 1932   2 Sheets-Sheet 2

INVENTOR
GEORGE W. PERKS
BY
ATTORNEYS

Patented July 18, 1933

1,919,168

UNITED STATES PATENT OFFICE

GEORGE W. PERKS, OF AKRON, OHIO, ASSIGNOR OF ONE-HALF TO EVALENA L. AUSTIN, OF AKRON, OHIO

COMPOSITE FRICTION MATERIAL AND METHOD FOR MAKING THE SAME

Application filed February 24, 1932. Serial No. 594,826.

This invention relates to composite friction material such as used in brakes, clutches, piston rings, packing or the like, and to methods for producing same.

The general purposes of the invention are to provide an improved composite structure in which frictional material is associated with an improved binder and to provide an improved method for making the same.

Another purpose of the invention is to provide composite or laminated structures of frictional material and heat conducting material so designed that a large part of the heat generated by friction is conducted away from the frictional material and from the surface with which it is engaged.

Of the accompanying drawings,

Figure 1 is a sectional view through a brake embodying the invention;

Figure 2 is an enlarged fragmentary sectional view of the peripheral portion of the brake;

Figure 3 is a plan view of associated blocks of the composite frictional material;

Figure 4 is a section on line 4—4 of Figure 3;

Figures 5, 5A:
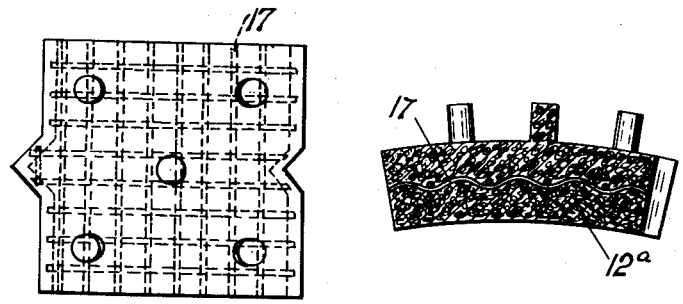
Figure 5 is a sectional view through a modified form of composite block.
Figures 6, 7:
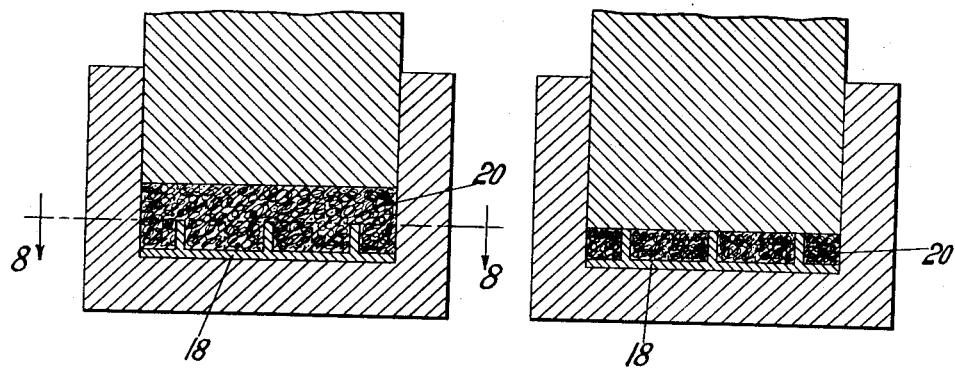
Figure 8:
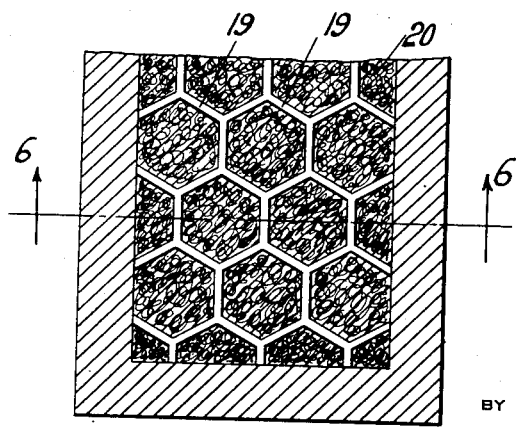

Figure 5ª is a plan view of the composite block shown in Figure 5;

Figure 6 is a section through a suitable molding press as on line 6—6 of Figure 8 showing another form of composite block embodying the invention being made therein;

Figure 7 is a similar view showing the compacted block in the mold; and

Figure 8 is a section on line 8—8 of Figure 6.

To produce structures in accordance with the invention, a sufficient quantity of heat resisting frictional material such as asbestos is thoroughly and intimately mixed and intermingled with a binder comprising comminuted, powdered or flocculent metal or combinations of metals, made either mechanically by electrodeposition or otherwise. The mixing may be accomplished mechanically by agitation, by sprinkling one over the other, or by electrodeposition or precipitation of one in and about the other. Such electrodeposition or precipitation may be accomplished by coating the asbestos fibres with a conductor such as graphite and depositing or precipitating the metal from a solution onto the fibers so coated. Graphite, comminuted carbon or other suitable permanent lubricant may be added to the mass. This mass may be reinforced by metallic sheets, screens or grids and may be built up in a number of layers.

The composite material thus made is subjected to compression in molds of the desired shape and heated to a point sufficient to bring the molds to a temperature at which the metal will sweat or fuse to bind the mass into an integral block in which the metal, besides serving as a binder, acts effectively to conduct heat away from surfaces with which the block is in frictional engagement.

One embodiment of the invention is illustrated in Figures 1 to 4 of the accompanying drawings in which the numeral 10 designates a brake drum, 11 a brake band and 12, 12 blocks of the composite material secured to the band for engaging the periphery of the drum.

The blocks 12 may be formed with rivet studs 13, 13 which may be extended through apertures 14, 14 in the band and riveted thereover at the outside of the band. The blocks may be closely spaced about the band with sufficient clearance to permit flexing of the band to tighten it about the drum and to prevent lateral displacement of the blocks they may be formed with projections 15 and recesses 16 in the edges thereof whereby the projection 15 on one block engages in the recess 16 of an adjacent block (see Figures 3 and 4).

In Figure 5 the block 12ª is shown with a reinforcing screen 17 therein, the screen being incorporated into the block by applying over a lower layer of the composite material and then applying an upper layer over the screen and pressing to shape thus producing in effect a laminated structure comprising upper and lower layers of the composite material and the intermediate screen.

As illustrated in Figures 6, 7 and 8, composite friction blocks may be made by providing a plate 18 preferably of metal such as copper with partitions 19, 19 on a face thereof defining pockets for receiving the composite material indicated at 20 which may be forced into and compressed in said pockets as indicated in Figures 6 and 7 and heat treated to fuse or sweat the metal therein.

In all forms of the invention the metal in the composite structure and connected to the brake bands or backing plates, etc., serves to conduct heat from the surfaces in frictional engagement whereby the life of the brake is substantially increased and injury to tires or other rubber parts adjacent the brakes is obviated by prevention of overheating.

The invention disclosed herein may utilize any of several well-known forms of powdered or comminuted metals such as copper, for example, the flocculent form of copper produced by an electro-chemical process and of the character of the flocculent copper disclosed in Patent No. 1,777,371, granted October 7, 1930, powdered copper made by the reduction of copper oxide in accordance with the well-known commercial process and other commerial forms of powdered or comminuted copper, the two specifically mentioned above, however, being preferred.

Modifications of the invention may be resorted to without departing from the spirit thereof or the scope of the appended claims.

What is claimed is:—

1. A composite structure including a metal sheet formed with webs providing a grid on a side thereof, and a layer of frictional fibrous material together with a metallic binder compressed onto said side of said sheet and heat treated to bond the structure by the fusion of metal.

2. A composite frictional material comprising a block including compressed mixture of particles of metal and particles of heat-resisting friction material in which the metal particles are heated to bind the frictional material and integral formations on the block whereby it may be riveted to a heat conducting supporting element for conducting heat away from said block when engaged frictionally on a surface.

3. A device for applying frictional resistance to relative movement of a pair of elements comprising means connected to one element and providing a heat-conducting support, a block comprising a compressed and heat-treated homogeneous mixture of metallic particles and particles of heat resisting frictional material, said block being secured to said support whereby heat from the block induced by friction thereof against a surface will be effectively conducted through the block to the support.

4. A composite frictional material comprising a homogeneous mixture of heat-resisting particles of frictional material commingled with particles of a solid lubricant and particles of metal, said material being held together by compression and by the fusion of the metal particles therein.

5. A frictional material comprising a laminated structure including a homogeneous mixture of particles of frictional material together with particles of metal providing a binder, and a layer of metal, said homogeneous mixture being pressed into a composite structure and bonded thereto by compression and by fusion of said metallic particles, said metal layer providing means for conducting heat from the frictional material.

6. A frictional material comprising a laminated structure including a plurality of layers, each layer of which comprises a homogeneous mixture of commingled mineral fiber, metallic particles and particles of a solid lubricant, and a metallic layer, the laminations being held together by compression of the particles and by the fusion of the metal particles therein.

7. A frictional material comprising a laminated structure including a plurality of layers each comprising a homogeneous mixture of heat resisting particles commingled with metallic particles, and a metallic layer, said structure being held together by compression and heat treatment of the mass.

8. A composite frictional material comprising a homogeneous mixture of heat resisting particles of frictional material commingled with particles of metal, said material being held together by compression and by heat treatment of the metal particles therein.

9. A composite frictional material comprising a homogeneous mixture of heat-resisting particles of frictional material commingled with particles of a solid lubricant and particles of metal, said material being held together by compression and by heat treatment of the metal particles therein.

GEORGE W. PERKS.